May 30, 1950     R. B. WILLOUGHBY     2,509,621
DYNAMIC PRESSURE MEASUREMENT

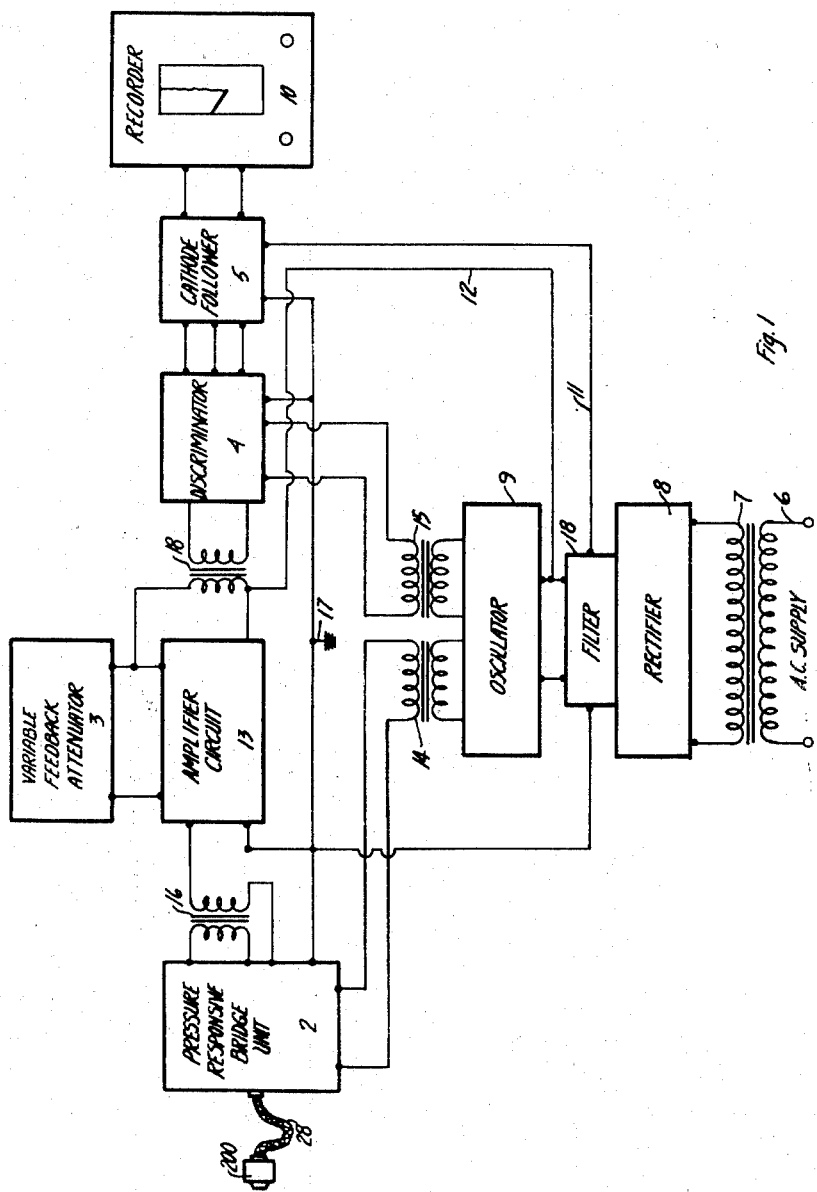

Filed Oct. 26, 1948     2 Sheets—Sheet 2

Inventor: Richard B. Willoughby
By: *[signature]*
His Attorney

Patented May 30, 1950

2,509,621

UNITED STATES PATENT OFFICE 2,509,621

DYNAMIC PRESSURE MEASUREMENT

Richard B. Willoughby, Oakland, Calif., assignor to Shell Development Company, San Francisco, Calif., a corporation of Delaware Application October 26, 1948, Serial No. 56,565

3 Claims. (Cl. 73—398)

This invention pertains to pressure measuring and recording systems, and relates more particularly to improvements in apparatus for electrically measuring and recording dynamic pressures susceptible of measurement by wire strain gauge means.

The present system is applicable to the measurement and recording of dynamic or fluctuating pressures of any type, and is especially well adapted for the measurement and recording of pressures related to the pulsating flow of fluids in systems such as pipe lines, pumping installations, compressors, etc.

It is an object of this invention to provide a system for measuring and recording dynamic pressures or pressure variations, that is, transient pressures superimposed upon predetermined static pressure valves.

It is also an object of this invention to provide a pressure measuring and recording system wherein a pressure responsive element is used to modulate a carrier frequency current proportionally to dynamic pressures applied to said element, and the amplified and rectified modulation current is used to energize the recording element to produce a record of said dynamic pressures.

It is also an object of this invention to provide a pressure measuring and recording system comprising a compound measuring bridge circuit provided with resistance and inductance means for adjusting the output current of said bridge to substantially a zero value for a predetermined static pressure, whereby only dynamic pressure variation from said static pressure are recorded by the system.

These and other objects of the invention will be understood from the following description, taken with reference to the attached drawings, wherein:

Fig. 1 is a diagram showing the arrangement and the connections of the various units or circuits forming the present system;

Figure 3:
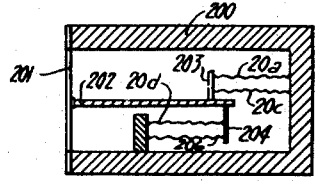
Fig. 3 is a diagrammatic showing of the pressure-responsive element used in the present system.

Referring to Fig. 1, a rectifier unit or circuit 8 is energized, for example, through a transformer 7, from a line supply of alternating current 6, having a voltage such as 115 to 120 volts and a frequency such as about 60 cycles.

The rectifier unit 8 energizes an oscillator unit 9, and also supplies, through leads 11 and 12, an operating direct current to the other units of the system. The rectifier 8 is provided with a conventional filter section 18 which comprises a sufficient number of stages for a substantially complete elimination of ripple voltage, said stages being tapped off at suitable points to give proper operating voltages for the other units of the system.

The oscillator circuit 9 supplies, through transformer winding 14, a carrier frequency to the bridge unit 2. The oscillator unit may be of any conventional, preferably push-pull regenerative type, operating at a frequency such as 1000 cycles, although such frequency is not critical.

The oscillator 9 also supplies, through transformer winding 15, a gate voltage to the discriminator circuit 4, to be described hereinbelow in more detail.

The measuring bridge unit 2, which incorporates suitable pressure responsive means 200, modulates the carrier frequency as a function of the dynamic pressure fluctuations to be recorded, and applies the modulated current, through a transformer winding arrangement 16, to the amplifier circuit 13, comprising a suitable number of amplification stages. A selective attenuator or range selector 3, operating on the variable feedback principle, is combined with the amplifier unit 3 for controlling the amplifier gain and maintaining the system at a sensitivity level most suitable for the particular pressure-responsive element used and the static pressure involved.

The amplified output current is applied, through a transformer arrangement 18, to the discriminator circuit 4, which operates to demodulate and to rectify this current, substantially balancing out the carrier wave and applying to the cathode follower unit 5 a signal produced by the rectification of the modulation current superimposed by the bridge on the carrier current wave.

The cathode follower circuit 5 acts to match the output of the discriminator 4 with the input of the recorder 10 and to apply it thereto. The recorder 10 may comprise, for example, a motor driven stylus or pen adapted to trace on a movable chart the record of the desired pressure variations.

Figure 2:
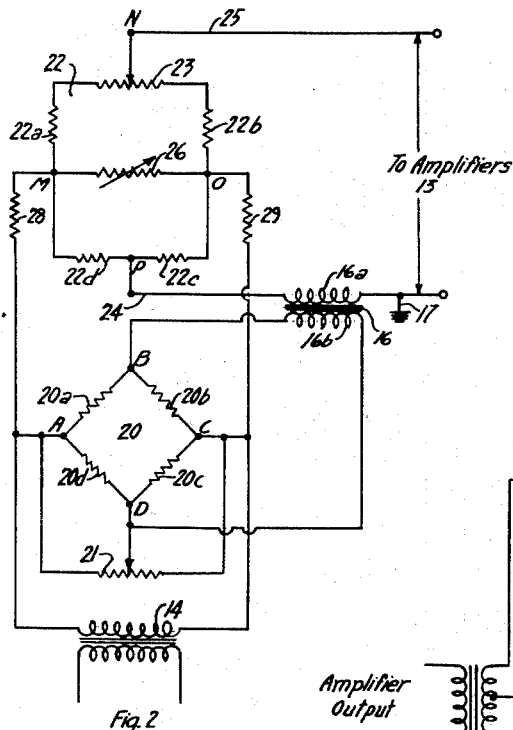
Fig. 2 is a circuit diagram of the compound measuring bridge of the present invention.

Referring now in greater detail to the essential units of the present system, Figs. 2 and 3 show, respectively, the circuit of the bridge unit 2 of the present invention, and the pressure-responsive element 200 such for example as a Statham pressure transmitter or wire strain gauge.

Transmitters or gauges of this type are well known in the art, and will be described with reference to Fig. 3 only insofar as necessary for the general understanding of this invention.

Fig. 3 shows a cartridge or casing 200 closed by a diaphragm 201. A stem 202 is mechanically actuated by the diaphragm and carries pins 203 and 204. Stretched between these pins and the casing in any desired manner are resistances or strain elements 20a, 20b, 20c and 20d, electrically connected to form the measuring bridge 20 shown in Fig. 2.

It will be seen that when pressure is applied to the diaphragm 201, a deflection of said diaphragm and of the stem 202 to the right increases the tension and the resistance value of the strain elements 20b and 20d, but decreases the tension and the resistance value of strain elements 20a and 20c, thus unbalancing the bridge, which is built for balance at zero pressure applied to the diaphragm.

It must be noted that, due to unavoidable constructional difficulties, the bridge 20 is inherently slightly unbalanced even when no pressure is applied to the diaphragm 200. To correct this condition, the bridge 20 is connected into the circuit of the present system through an auxiliary variable resistance 21, whereby the bridge may be adjusted for proper balance at zero diaphragm pressure.

When so adjusted, the bridge will not deliver to the input of the amplifiers any current when the pressure to which the diaphragm is exposed is zero or atmospheric, but will reproduce any pressure changes in the form of proportional current variations.

However, the normal static pressure in conduits in which the pressure-responsive element of Fig. 3 is immersed for measurement purposes does not necessarily always remain zero, but may have any value above that of the atmosphere, such as 20, 40, 60, etc. lbs./sq. in. Therefore, it is desirable that the balance point of the bridge, that is the point at which the current output from the bridge is zero, should be capable of adjustment to the particular static pressure value over which the dynamic pressure fluctuations are to be measured.

For this purpose, there is provided, according to the present invention, a second bridge 22 having resistances 22a, 22b, 22c and 22d as its arm. A variable resistance 23 is connected between arms 22a and 22b.

It will be seen that bridge 22 is connected to the energizing transformer 14 in parallel with bridge 20 through resistances 28 and 29. Bridge 20 is energized at points A and C located between arms 20a and 20d and between arms 20b and 20c respectively, while the potential across said bridge is measured across points B and D located between arms 20a and 20b and arms 20c and 20d. In a similar way, bridge 22 is energized at points M and O, and is balanced across points N and P.

Points N and P, forming the output of bridge 22, are connected to the input of the amplifier circuit 13 through leads 24 and 25, lead 24 being grounded at 17, and comprising a coil 16a forming one of the windings of a transformer 16, whose other winding 16b is connected to points B and D, forming the output of bridge 20.

The transformer 16 is used to mix the outputs of the two bridges in any desired proportion, but preferably in a ratio of 1 to 1.

The double bridge arrangement described hereinabove affords several advantages. First, a proper setting or adjustment of resistance 23 permits the balance or zero current point of bridge 20 to be set at any desired or predetermined value of static pressure, such as 20, 40, 100, etc. lbs./sq. in. applied to the strain gauge element, the dynamic pressures or pressure variations superimposed on said predetermined static value being therefore measured and recorded without distortion by any unbalance current due to static pressure. Second, since only the bridge 22 is grounded, as shown at 17, the transformer 16 serves as an isolation transformer to maintain the points A, B, C, D of the non-grounded bridge 20 at an equal potential from the ground and to balance out, or automatically compensate for any stray capacitance effects, such chiefly as those due to the use of a cable of varying lengths with the pressure element, the use of pressure elements of different size, etc. In view of the relatively high frequency of the carrier current used for energizing the bridges, these capacitance effects, unless neutralized, have an unsettling effect on the system and prevent the bridge from coming to a sharp zero balance. A variable resistance 26 is connected between points M and O of the bridge 22. The purpose of this resistance is to permit different pressure-responsive elements to be interchangeably used with the present system. Thus, if it is desired to use the present system for dynamic pressure measurements first in a range such as from 0 to 20 lbs./sq. in., and then in a range such as from 0 to 400 lbs./sq. in., this may be effected by using properly selected readily available pressure gauges made for operation in these ranges. These gauges, however, differ from each other by the ohmic value of their resistances 20a, 20b, 20c and 20d, and by the ratio of resistance change to total resistance corresponding to a pressure change expressed in per cent of total gauge range. A proper adjustment of the resistance 26 thus permits gauges to be interchangeably used in the present system without disturbing the calibration of the resistance 23, which would be undesirable as the resistance 23 is preferably calibrated in terms of per cent of full scale deflection of the gauge for the purpose of permitting a quantitative interpretation of the recorded deflection curve traced by the recorder. More specifically, a proper adjustment of the resistance 26 permits the maximum output voltage of bridge 22 to be adjusted to correspond exactly to the maximum output voltage of bridge 20, so that a linear calibration of resistance 23 will give a direct measurement of the output voltage of bridge 20 and consequently of the pressure applied.

The output of the double bridge 20 and 22 is applied to the input of the amplifier 13, which may be of any conventional design and should preferably have a sufficient number of amplification stages in cascade to permit operation at reduced gain so as to ensure a proper linearity of response.

Figure 4:
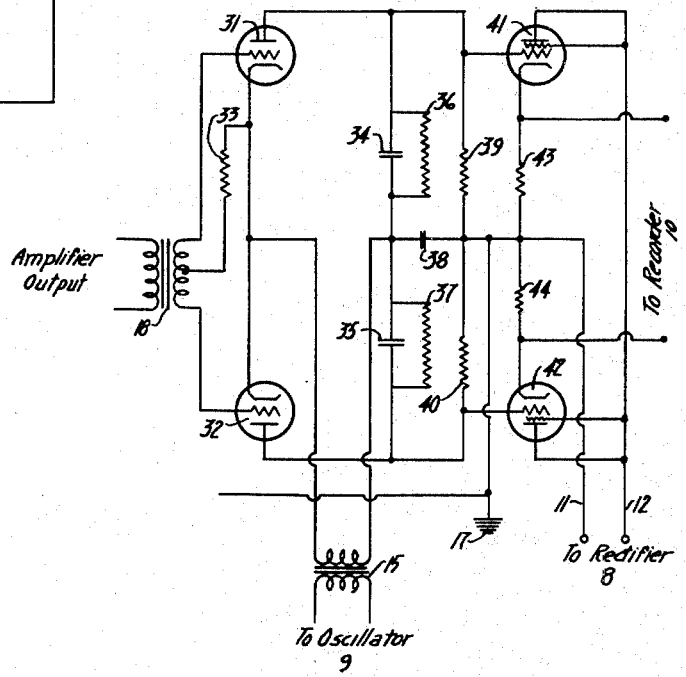
Fig. 4 is a circuit diagram of the discriminator circuit of the present system.

The output of the amplifier is fed by means of a transformer 18, to the discriminator and cathode follower circuits shown in Fig. 4.

The discriminator circuit preferably comprises two thermionic tubes 31 and 32, which may conveniently be formed of the two halves of a suitable single twin triode tube. Tubes 31 and 32 are connected in push-pull arrangement, their cathodes being tapped through a resistance 33 to the mid-point of the secondary of transformer 18. The discriminator effect is obtained by applying, between the cathodes and the plates of tubes 31 and 32, a gate voltage derived from oscillator 9 through transformer 15, condensers 34 and 35 and resistances 36 and 37 being used in the plate circuit of the tubes.

The output of the discriminator circuit is applied, through means comprising a condenser 38 and resistances 39 and 40, to a cathode follower circuit comprising thermionic tubes 41 and 42, whose plate voltage is supplied through lead 12 from the rectifier 8. The output of the cathode follower circuit is connected to the input of the recorder circuit 10, resistances 43 and 44 being interposed to the ground 17. The cathode follower circuit is thus used as an isolation stage to match the high output impedance of the discriminator circuit with the normally low input impedance of the recorder.

The recorder 10 may comprise any suitable type of preferably direct-inking recording mechanism. Since the structure of such mechanisms is well known in the art and forms no part of this invention, it will be sufficient to say that the recorder may comprise a motor energized by the output of the cathode follower, a stylus or pen actuated by said motor to trace a graph on a chart, and a time-responsive chart drive, whereby pressure-time curves may automatically be recorded on charts.

The operation of the whole system may be briefly summarized as follows:

The oscillator 9 supplies a carrier frequency of the order of 1000 cycles to the bridge 20, forming part of a pressure-responsive element 200, which may, for example, be immersed in a fluid within a pressure conduit, being connected to the rest of the system by a suitable conductor cable 28.

A proper setting of the resistance 23 on the upper bridge 22 adjusts the pressure-responsive double bridge unit 2 for balance at the particular static pressure prevailing in said conduit, for example, 40 lbs./sq. in., etc. That is, any modulating output current produced by the bridge 20 due to the fact that the static pressure applied to the gauge is not zero, but 40 lbs./sq. in., will be neutralized by an equal modulating current of opposite phase produced by the bridge 22, the neutralizing action being effected by the inductive coupling of the two windings of transformer 16.

However, any dynamic pressures, that is, any fluctuating pressures momentarily adding to or subtracting from the absolute value of the static pressure, will further unbalance the bridge 20, causing it to deliver a modulating output current which is not neutralized by the bridge 22.

The amplifier unit 13 thus receives a modulated current of the carrier frequency, the amplitude of the modulated envelope being proportional to the magnitude of the dynamic pressures.

The modulated carrier wave is amplified by the unit 13 with a gain determined by the setting of the selective feedback attenuator 3, regulating the sensitivity of the system.

The output of the amplifier, that is, an amplified modulated carrier frequency current, is applied to the grids of the push-pull tubes 31 and 32, while a gate current of the same carrier frequency is applied to the plates of said tubes from oscillator 9 through transformer 15. It will, however, be seen that while the modulated carrier current applied to the grid of tube 31 is 180 electrical degrees out of phase with that applied to the grid of tube 32, the non-modulated carrier current applied to the plate of tube 31 is in phase with that applied to the plate of tube 32. It will be understood by those familiar with the art that this arrangement will permit the discriminator circuit to rectify and to demodulate the output of the amplifier, to eliminate to a desired predetermined degree the carrier wave, to block out all out of phase components of the amplifier output, and to apply the rectified modulation current or signal to the input of the follower circuit, whose output is of sufficient current intensity to drive the pen recorder.

The resistance 23 of the bridge 22 being calibrated in per cent of total pressure gauge deflection, and the amplification gain of the system being known from the setting of the attenuator 3, the pen deflection amplitudes of the recorder 10 can be readily converted to and expressed in terms of pounds per square inch pressure.

I claim as my invention:

1. A system for recording dynamic pressures, comprising a source of carrier frequency current, a pressure responsive element energized by said carrier current for translating pressures into electric currents, said element comprising resistances connected to form the four arms of a measuring bridge, a second adjustable bridge connected to said source of carrier current in parallel with said first bridge, inductive means coupling the outputs of said two bridges, variable resistance means in said second bridge for adjusting the coupled output of said two bridges to a zero current value at a predetermined value of static pressure applied to said element, whereby said carrier current is modulated by said coupled bridges in proportion to dynamic pressure variations superimposed on said static pressure value, means for amplifying said modulated carrier current, electronic circuit discriminator means for rectifying and demodulating said amplified current, and recorder means connected to the output of said discriminator means for recording variations in the rectified modulation current supplied to said recorder means by said discriminator means.

2. In a system comprising a source of carrier frequency current and a recorder circuit for recording dynamic pressure variations, the improvement comprising a compound measuring bridge unit for translating said dynamic pressure variations into electric currents capable of modulating said carrier frequency current, said unit comprising a pressure responsive element having resistances connected to form the four arms of a first measuring bridge, the relative values of said resistances being variable proportionlly to the variations of the pressure applied to said element, a second adjustable bridge, means connecting the inputs of said bridges in parallel to supply thereto said carrier frequency current from said source, conductor means connecting the output of said second bridge to the input terminals of said recorder circuit, coil means in said conductor means, second coil means inductively coupled with the first coil means, said second coil means being connected to the output of said first bridge, whereby the points of junction of the four arms of said bridge are maintained at the same potential with regard to the ground, and variable resistance means in said second bridge, whereby an unbalanced output current from the first bridge due to a static pressure of predetermined value can be neutralized through said inductive coupling means by an output current from the second bridge of an intensity determined by the setting of said variable resistance.

3. In a system comprising a source of carrier frequency current and a recorder circuit for recording dynamic pressure variations, the improvement comprising a compound measuring bridge unit for translating said dynamic pressure variations into electric currents capable of modulating said carrier frequency current, said unit comprising a pressure responsive element having resistances connected to form the four arms of a first measuring bridge, the relative values of said resistances being variable proportionally to the variations of the pressure applied to said element, a second adjustable bridge, means connecting the inputs of said bridges in parallel to supply thereto said carrier frequency current from said source, the output of said second bridge being connected to the input of said recorder circuit, coil means inductively coupling the output of said first bridge with the output of said second bridge, and variable resistance means in said second bridge, whereby an unbalance output current from the first bridge due to a static pressure of predetermined value is neutralized through said inductive coupling means by an output current from the second bridge of an intensity determined by the setting of said variable resistance.

RICHARD B. WILLOUGHBY.

REFERENCES CITED

The following references are of record in the file of this patent:

UNITED STATES PATENTS

| Number | Name | Date |
|---|---|---|
| 2,367,866 | Humphreys et al. | Jan. 23, 1945 |
| 2,393,669 | Wheaton et al. | Jan. 29, 1946 |
| 2,483,300 | Howe | Sept. 27, 1949 |